(12) United States Patent
Hashimoto et al.

(10) Patent No.: US 6,204,908 B1
(45) Date of Patent: *Mar. 20, 2001

(54) REFLECTING CHOLESTERIC LCD HAVING VIEWER SIDE LAYER WHICH EITHER SCATTERS OR TRANSMITS LIGHT DEPENDING ON ANGLE

(75) Inventors: Kiyofumi Hashimoto; Takuji Hatano, both of Suita; Masakazu Okada, Takatsuki, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,864

(22) Filed: Sep. 15, 1997

(30) Foreign Application Priority Data

Sep. 20, 1996 (JP) ........................................................ 8-249954

(51) Int. Cl.[7] .......................... C09K 19/02; G02F 1/1333; G02F 1/1335
(52) U.S. Cl. ............................... 349/176; 349/86; 349/112
(58) Field of Search .................................... 349/33, 35, 89, 349/176, 179, 183, 185, 188, 112, 86, 93

(56) References Cited

U.S. PATENT DOCUMENTS

| 4,838,662 | * | 6/1989 | Hilsum et al. ........................ 350/350 |
| 5,164,223 | * | 11/1992 | Tsujino et al. ........................ 427/520 |
| 5,408,344 | * | 4/1995 | Takiguchi et al. ...................... 359/40 |
| 5,437,811 | * | 8/1995 | Doane et al. .......................... 252/299 |
| 5,459,592 | * | 10/1995 | Shibatani et al. ...................... 359/40 |
| 5,629,784 | * | 5/1997 | Abileah et al. ....................... 349/112 |
| 5,724,111 | * | 3/1998 | Mizobata et al. ..................... 349/112 |
| 5,889,570 | * | 3/1999 | Mitsui et al. ......................... 349/113 |
| 5,953,089 | * | 9/1999 | Hiji et al. ............................. 349/112 |

FOREIGN PATENT DOCUMENTS 0669541    8/1995  (EP) .

* cited by examiner

Primary Examiner—Walter J. Malinowski
(74) Attorney, Agent, or Firm—Sidley & Austin (57) ABSTRACT

A reflecting liquid crystal display unit that reflects light entering from an observer side to display an image. The reflecting liquid crystal display has a composite layer of cholesteric liquid crystal material and polymer resin, and an an isotropic scattering layer. The an isotoropic scattering layer scatters light entering this layer at a relative large incident angle passes light entering this layer at a relative small incident angle. The an isotropic scattering layer is provided on an observer side of the composite layer.

18 Claims, 4 Drawing Sheets

LUMINANCE (ABU)

VIEWING ANGLE (deg)

REFLECTING CHOLESTERIC LCD HAVING VIEWER SIDE LAYER WHICH EITHER SCATTERS OR TRANSMITS LIGHT DEPENDING ON ANGLE

BACKGROUND OF THE INVENTION

1. Field of the Invention

The present invention relates to a reflecting liquid crystal display unit that performs display via reflection using liquid crystal.

2. Description of the Related Art

Various types of liquid crystal display units have conventionally been proposed. For example, a TFT liquid crystal device in which each pixel has a thin film transistor has been put into practical use. While a TFT liquid crystal device is capable of high precision display, it requires a precise and complex manufacturing process. Moreover, the manufacturing yield for such devices is poor, leading to an increase in costs.

With this as a backdrop, a polymer-based dispersed liquid crystal device, which is relatively easy to manufacture, has been drawing attention. This liquid crystal device uses a layer containing a composite of liquid crystal and polymer, which is created by dispersing a liquid crystal in a polymer material. For example, U.S. Pat. No. 5,437,811 discloses a liquid crystal display unit that performs color display by means of the selective reflection characteristic of a liquid crystal that exhibits a cholesteric characteristic. This liquid crystal device performs display via reflection using the focal conic state (a colored transparent state) and the planar state (a scattering state) of a chiral nematic liquid crystal. The focal conic state is a state in which the helical axes of liquid crystal molecules are aligned in a random fashion, whereas the planar state is a state in which the helical axes of liquid crystal molecules are aligned parallel to one another. This liquid crystal element scatters incident light in the focal conic state and selectively reflects light of a certain wavelength in the planar state. The liquid crystal device changes from the planar state to the focal conic state with the application of low voltage pulses, while it changes from the focal conic state to the planar state with the application of high voltage pulses.

Generally, the two states of said liquid crystal that exhibits a cholesteric characteristic have a stable memory capability. That is, even after the cease of voltage pulses, these states are maintained. Therefore, high precision display becomes possible using merely a simple matrix drive without the need for a complex circuit using active elements as in the case of TFT liquid crystal.

In the planar state, liquid crystal selectively reflects the light component having a specific wavelength among the rays of the incident light which enters the liquid crystal in parallel to the helical axes of the liquid crystal. The specific wavelength $\lambda$ corresponds to helical pitch p and average refractive index n of the liquid crystal, that is, $\lambda = n \times p$. The light that enters the liquid crystal parallel to the helical axes when the liquid crystal is in the planar state is divided into two types of circular polarization, i.e., right rotary polarization and left rotary polarization. The light component for one rotary direction passes through the liquid crystal while the light component for the other rotary direction is reflected completely by the liquid crystal. This property is called circular polarization dichroism. Because of this property, the reflection rate of the display unit in the planar state, i.e., the selective reflection state, is 50% at the maximum, and therefore where the planar state is used as a bistable display state, the luminance of the display is limited.

In order to resolve this problem, U.S. Pat. No. 5,408,344, for example, proposes a technology in which the luminance is improved by inserting a reflecting layer, located between the liquid crystal layer and the light absorbing layer (namely, opposite the observer side of the liquid crystal layer), having a scattering characteristic that varies depending on the angle of the incident light.

However, display units that use conventionally proposed liquid crystal-polymer composite layers have a problem that, where the illuminating light is fixed, the peak wavelength of the reflected light fluctuates greatly depending on the viewing angle, and the color of the display changes accordingly when observed. For example, if a reflecting liquid crystal display unit is placed on an indoor wall, e.g., a wall of a meeting room, light enters the liquid crystal display device at an angle from the illuminating source located on the ceiling. In such an environment, the display color changes depending on where the observer is situated.

SUMMARY OF THE INVENTION

The present invention was made in consideration of these problems. The main object of the present invention is to provide an improved reflecting liquid crystal display unit.

Another object of the present invention is to provide a reflecting liquid crystal display unit that has a sufficiently high luminance.

The third object of the present invention is to provide a reflecting liquid crystal display unit in which the reflected light's peak wavelength is less dependent on the viewing angle.

The fourth object of the present invention is to provide a reflecting liquid crystal display unit that has a sufficiently high luminance and in which the reflected light's peak wavelength is less dependent on the viewing angle.

In order to attain at least one of the objects described above, the reflecting liquid crystal display unit of the present invention has an anisotropic light scattering layer on the observer side of the liquid crystal layer. It is preferred that the liquid crystal layer include a cholesteric liquid crystal. For cholesteric liquid crystal, a chiral nematic liquid crystal in which a chiral ingredient is added to a nematic liquid crystal may be used. The liquid crystal layer may also be a layer comprising a liquid crystal-polymer resin composite, for example. The composite layer may be prepared, for example, by mixing a photopolymer resin and a liquid crystal and then photopolymerizing the mixture. The anisotropic light scattering layer is a layer which selectively scatters the incident light depending on the incident angle at which the light enters it. The anisotropic light scattering layer preferably scatters the light that enters it at a relatively sharper angle and lets pass the light that enters it at angles closer to a right angle. The anisotropic light scattering layer may be placed on the outermost surface of the liquid crystal display unit facing the observer, but it may be located elsewhere as well.

BRIEF DESCRIPTION OF THE DRAWINGS

In the following description, like parts are designated by like reference numbers throughout the several drawings.

DETAILED DESCRIPTION OF THE PREFERRED EMBODIMENTS

The embodiments of the present invention are explained below with reference to the drawings.

1. FIRST EMBODIMENT

Figure 1:
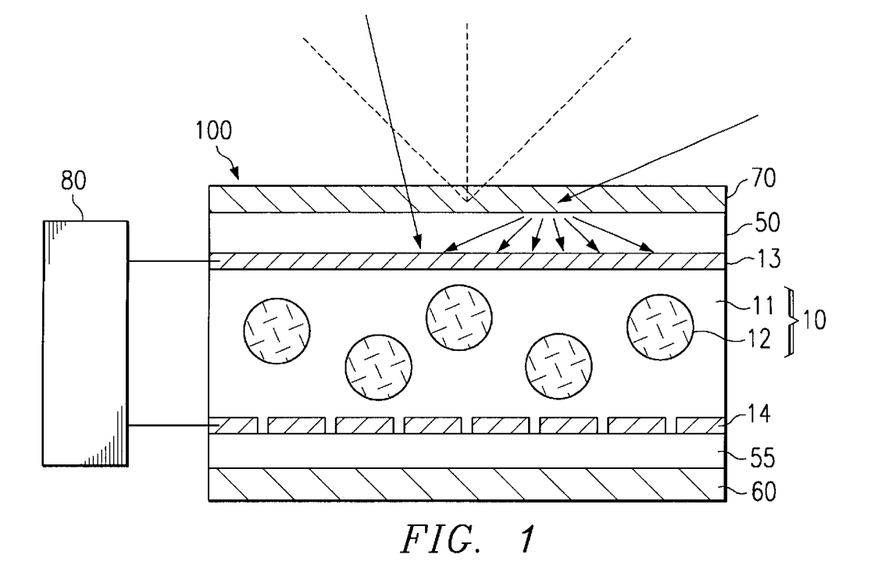
FIG. 1 shows a cross-sectional view of a liquid crystal display unit of one embodiment of the present invention.

As shown in FIG. 1, liquid crystal display unit 100 comprises transparent base 55, transparent electrodes 14, liquid crystal-polymer composite layer (simply referred to as 'composite layer' below) 10 to perform display of a specific color, transparent electrodes 13, transparent base 50 and anisotropic light scattering layer 70, said members being placed one on top of the other in said sequence. Transparent electrodes 13 and 14, e.g., ITO electrodes, are connected to power supply 80 such that voltage may be applied to composite layer 10.

In this embodiment, the upper side of liquid crystal display unit 100 in FIG. 1 is the observer side. If light is projected onto liquid crystal display unit 100 from the upper side when the liquid crystal of composite layer 10 (liquid crystal that exhibits a cholesteric characteristic, hereinafter simply referred to as 'cholesteric liquid crystal') is in the planar state, composite layer 10 reflects light of a specific wavelength from among the rays of incident light. Where this specific wavelength is set within the visible light range, liquid crystal display unit 100 performs display of a color of said specific wavelength. On the other hand, where the specific wavelength is set outside the visible light range, i.e., in the infrared light range, for example, composite layer 10 reflects infrared light and lets pass visible light, and consequently liquid crystal display unit 100 appears transparent to the observer. Where light absorbing member 60 (a black plate or black film, for example) is placed behind liquid crystal display unit 100 (opposite from the observer side), as shown in FIG. 1, liquid crystal display unit 100 appears black to the observer because the visible light that passed through composite layer 10 is absorbed by light absorbing member 60. Light absorbing member 60 may be substituted for by the application of a black paint, such as a black ink, onto the surface farthest from the observer, for example.

If light is projected onto liquid crystal display unit 100 from the upper side when the cholesteric liquid crystal of composite layer 10 is in the focal conic state, composite layer 10 scatters or lets pass the incident light depending on the characteristics of the liquid crystal that is used. Where birefringence $\Delta n$ is small, as a characteristic of the liquid crystal, or where the domain of the liquid crystal is small, composite layer 10 lets pass the visible light component of the incident light when it is in the focal conic state. Therefore, liquid crystal display unit 100 appears transparent to the observer in this case (black if light-absorbing member 60 is used). On the other hand, where birefringence $\Delta n$ is large, as a characteristic of the liquid crystal, or where the domain of the liquid crystal is large, composite layer 10 scatters the visible light component of the incident light when it is in the focal conic state. Therefore, liquid crystal display unit 100 appears white to the observer in this case. Here, birefringence $\Delta n$ mentioned above may be obtained from the equation $\Delta n = n_1 - n_2$, where $n_1$ is the refractive index of the liquid crystal molecule along its length and $n_2$ is the refractive index of the liquid crystal molecule along the direction perpendicular to its length.

The liquid crystal of composite layer 10 switches from the focal conic state to the planar state, or vice versa, in response to the two types of voltage that are applied, i.e., high and low voltage. Specifically, when low voltage signal is applied to composite layer 10, the liquid crystal exhibits the focal conic state following the application of the voltage. When high voltage signals are applied to composite layer 10, the liquid crystal exhibits the planar state following the application of the voltage. It is preferable that a pulse voltage be used, as mentioned above, for the voltage that is applied between the transparent electrodes in order to switch the state of composite layer 10.

Anisotropic light scattering layer 70 allows light that enters the observed surface from an angle within a prescribed range relative to the normal line of said surface to advance straight ahead (i.e., pass through) and scatters light that enters said surface from an angle outside said prescribed range. For anisotropic light scattering layer 70, Sumitomo Chemical Co., Ltd.'s field of view regulating film "Lumisty" series, for example, is available. By placing said anisotropic light scattering layer 70 on the observer side of composite layer 10, light that enters at an angle may be scattered on the surface of the anisotropic light scattering layer 70. By the scattering, incident angle of some component of the light is changed to relatively small. Moreover, by the scattering, the light which would be reflected by the surface of the liquid crystal display unit can enter to the composite layer. Consequently, the amount of light entering composite layer 10 increases and the luminance of the display increases accordingly. Moreover, the selective reflection wavelength of cholesteric liquid crystal generally becomes shorter as the incident angle or reflection angle increases. Therefore, the larger the viewing angle, the greater the color discrepancy. However, as described above, the illuminating light that enters liquid crystal display unit 100 at an angle enters composite film 10 as scattered light because of the existence of anisotropic light scattering layer 70, and consequently, the incident angle of the incident light with regard to the composite layer decreases overall and the occurrence of color discrepancy may be reduced.

Paired transparent electrodes 13 and 14 each comprise a plurality of strip electrodes that are aligned parallel to one another with small spaces in between. Transparent electrodes 13 and 14 face each other such that the direction of alignment of the strip electrodes of electrodes 13 is perpendicular to that of the alignment of the strip electrodes of electrodes 14. Display is performed when electricity is sequentially provided to these strip electrodes 13 and 14, the former being above the latter, and voltage is sequentially applied in a matrix fashion to composite layer 10. Liquid crystal display unit 100 can perform image display based on said matrix drive.

For composite layer 10, a composite layer that may be obtained by projecting light, such as ultraviolet light, onto a mixture of a liquid crystal and a photo-cured resin material such that the resin is hardened and the liquid crystal and resin are separated is applicable. The construction of this composite layer may be such that the resin has a three-dimensional mesh construction and the liquid crystal fills the gaps in the resin, or such that multiple liquid crystal droplets are surrounded by the resin. The construction may also be one in which the resin forms multiple pillars formed between the upper and lower bases and the spaces formed among these pillars are filled by the liquid crystal. These composite layer constructions may be controlled by means of the ratio between the photopolymer resin material and the liquid crystal, the speed of photopolymerization, etc. The composite layer may also be made by forming a resin construction as described above and then pouring a liquid crystal into the gaps in said resin construction.

For the liquid crystal used in the composite layer 10, for example, cholesteric liquid crystal may be used as described above. Cholesteric liquid crystal, as a whole, has a multi-layer construction. In each layer, the lengthwise axes of the liquid crystal molecules are aligned parallel to one another. The lengthwise axes of the molecules of these liquid crystal layers are angled slightly relative to the neighboring layers such that the molecules show a spiral construction as a whole.

For the cholesteric liquid crystal, a liquid crystal that exhibits a cholesteric characteristic at room temperature is particularly preferred. In case of a display unit that is used in an environment where the temperature is relatively high, a cholesteric liquid crystal that exhibits a cholesteric characteristic in that environment is preferred. For the cholesteric liquid crystal, a chiral nematic liquid crystal, which is obtained by adding a chiral ingredient to a nematic liquid crystal, may be used. In a nematic liquid crystal, sticklike liquid crystal molecules are aligned parallel to one another but no layer construction is present. A chiral ingredient is an additive that twists the nematic liquid crystal molecules when added to a nematic liquid crystal. By adding a chiral ingredient to a nematic liquid crystal, a spiral construction with a prescribed pitch is formed with regard to the liquid crystal molecules, and this generates a cholesteric characteristic.

By changing the amount of chiral ingredient added to nematic liquid crystal, the pitch of the spiral construction of the chiral nematic liquid crystal can be changed, through which the selective reflection wavelength of the liquid crystal may be controlled. Generally, the helical pitch that is defined as the distance between molecules when liquid crystal molecules rotate 360 degrees along the spiral construction (i.e., the distance between layers) is used as a term that expresses the pitch of the spiral construction of liquid crystal molecules.

For a chiral ingredient, cholesteric liquid crystal having a cholesteric ring, chiral nematic liquid crystal and organic compounds that act to twist the molecules of nematic liquid crystal but do not show liquid crystal characteristics themselves may be used. For such organic compounds, a commonly marketed chiral doping agent—representative examples include Merck's organic compounds S811, S1011, etc.,—may be used.

More than one chiral ingredient may be mixed and used. The use of more than one chiral doping agent is effective in increasing the phase change temperature (the NI point) of the liquid crystal, reducing the change in the selective reflection wavelength that occurs as temperature changes, improving the transparency of the composite layer in the transparent state, and speeding up the switching between the transparent state and the selective reflection state of the liquid crystal display unit—particularly color liquid crystal display units, etc.

Composite layer 10 may be switched between a light pass-through state in which visible light is allowed to pass through and a selective reflection sate in which visible light of a specific wavelength is selectively reflected, or between a light scattering state in which visible light is scattered and a light pass-through state in which visible light is allowed to pass through, in response to the application of a specific voltage. Each state may be maintained even after the cease of voltage application.

In the case of composite layer 10 in which a chiral nematic liquid crystal is used, in particular, the state of alignment of the liquid crystal molecules may be switched between the planar state and the focal conic state by applying two types of pulse voltage, e.g., high and low pulse voltage.

Three layers may be formed as composite layer 10 in which a chiral nematic liquid crystal is used. In this case, the helical pitch may be adjusted by adjusting the amount of chiral ingredient added to the nematic liquid crystal of each layer, and the selective reflection wavelength in each layer may be set to red light, green light and blue light. By setting each layer in this way, each layer may have a selective reflection state colored red, green or blue when the liquid crystal molecules are in a planar alignment and a transparent light pass-through state when they are in a focal conic alignment. A liquid crystal display unit capable of color display may thus be provided.

In addition, if the amount of the chiral ingredient added is adjusted so as to adjust the helical pitch of the chiral nematic liquid crystal such that the selective reflection wavelength is set to infrared light, composite layer 10 is obtained that exhibits a transparent light pass-through state when the liquid crystal molecules are in a planar alignment and a light scattering state in which it appears white due to isotropic scattering when the liquid crystal molecules are in a focal conic alignment. By sandwiching composite layer 10 thus obtained between transparent electrodes, a white display unit may be obtained.

The relationship between helical pitch p (nm) and selective reflection wavelength λ (nm) is expressed by the following equation [I].

$$\lambda = n \times p \qquad [\text{I}]$$

where, n represents the average refractive index and $n^2 = (n_1^2 + n_2^2)/2$.

In order to make a color liquid crystal display unit that performs color display of various colors or a white liquid crystal display unit that performs white display, a method in which a mixture of liquid crystal and photo-cured resin material is sandwiched between a pair of transparent electrodes and the photo-cured resin material of the mixture is hardened by projecting light such as ultraviolet light onto the mixture such that the liquid crystal and the resin are separated. When this is done, if spacers are placed or dispersed between the electrodes together with the mixture, the thickness of composite layer 10 may be more easily controlled.

For the photo-cured resin material, a mixed solution of either a photo-cured monomer or an oligomer and a photo-polymerization starting agent may be used. In this case, the photopolymerization separating method may be used in which the mixture solution and a liquid crystal are mixed and the resin material is then photo-cured by projecting ultraviolet light onto it, such that the liquid crystal and the resin are separated.

2. SECOND EMBODIMENT

An example in which the liquid crystal display unit itself has electrodes was described in the first embodiment, but so long as an electric field is made to work so that the liquid crystal switches between a transparent state and a selective reflection state, the liquid crystal display unit itself need not necessarily have electrodes. Therefore, in this embodiment, an example in which electrodes to apply voltage to the composite layer are located outside the liquid crystal display unit will be explained.

Figure 2:
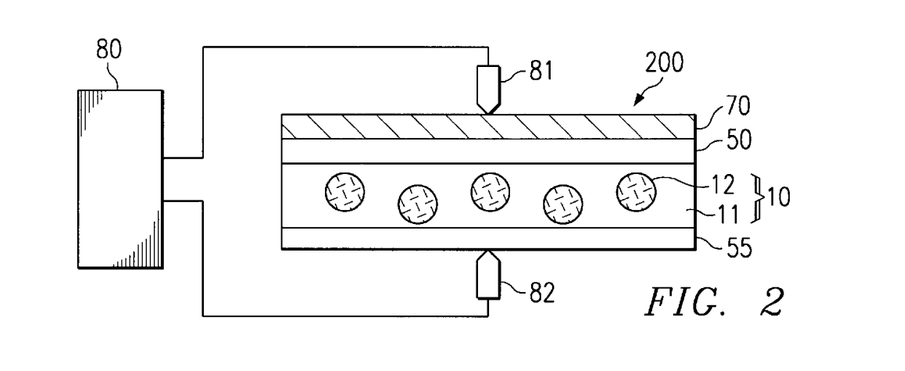
FIG. 2 shows a cross-sectional view of a liquid crystal display sheet, another embodiment of the present invention.

FIG. 2 shows a cross-sectional view of liquid crystal display sheet 200, one form of the second embodiment. As shown in FIG. 2, liquid crystal display sheet 200 comprises transparent base 55, composite layer 10 to perform display of a specific color, and transparent base 50, said members being placed one on top of the other in said sequence. Anisotropic light scattering layer 70 is formed on the outermost surface closest to the observer in the same manner as in the first embodiment. As shown in FIG. 2, a pair of electrodes 81 and 82 that are connected to power supply 80 are placed on the top and bottom surfaces of liquid crystal display sheet 200, and the alignment of the liquid crystal molecules may be changed and display performed by applying voltage to liquid crystal display sheet 200.

Figure 3:
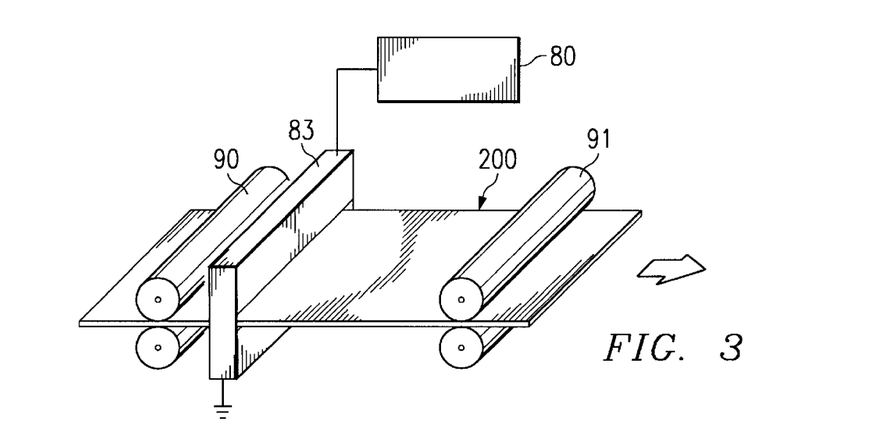
FIG. 3 shows one simplified construction for the application of voltage to the liquid crystal display sheet.

FIG. 3 shows one specific construction of the second embodiment that allows liquid crystal display sheet 200 to perform display. As shown in FIG. 3, this system is equipped with conveyance rollers 90 and 91, electrodes 83 that are placed along the width of liquid crystal display sheet 200 and power supply 80 to which electrodes 83 are connected.

By individually driving electrodes 83 based on image information while feeding the display sheet at a certain speed by means of conveyance rollers 90 and 91, an image may be formed on liquid crystal display sheet 200. By applying a uniform voltage via electrodes 83, the image on the sheet may be erased.

Figure 4:
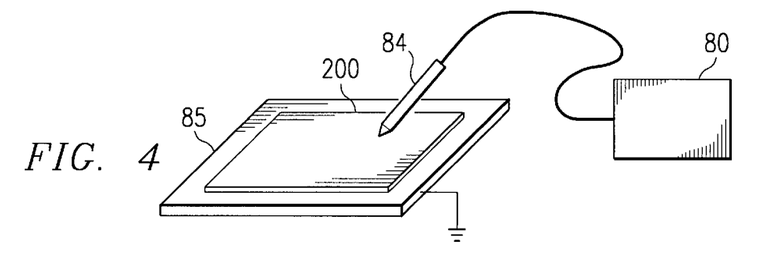
FIG. 4 shows another simplified construction for the application on of voltage to the liquid crystal display sheet.

FIG. 4 shows another specific construction of the second embodiment for the application of voltage. As shown in FIG. 4, a desired image may be formed on liquid crystal display sheet 200 by placing liquid crystal display sheet 200 on electrode plate 85 and moving pen-type electrode 84, which is connected to power supply 80, on liquid crystal display sheet 200. In this construction as well, an anisotropic light scattering layer is placed on the surface of liquid crystal display sheet 200 facing the observer.

The present invention is explained in more detail below with reference to specific experimental examples.

3. EXPERIMENTAL EMBODIMENT 1

A mixture made by mixing MN1008XX (from Chisso Corp.) and M15 (from Merck) at a weight ratio of 85:15 was used for the nematic liquid crystal. Chiral ingredient S811 (from Merck) was added to this nematic liquid crystal in 20 wt % to prepare a chiral nematic liquid crystal having a selective reflection wavelength of 1100 nm. Here, MN1008XX is a liquid crystal having tolane compound as its main component and having the physical properties shown below.

$\Delta n = 0.218$ ($\lambda = 589$ nm, $25°$ C.)

$T_{N-1} = 73.9°$ C.

$V_{90} = 2.16$ V $\eta_{20} = 31.4$ cps

A photo-cured resin material was then prepared by adding photopolymerization starting agent DAROCURE 1173 (from Ciba Geigy) in 3 wt % to monofunctional monomer R128H (from Nippon Kayaku).

The chiral nematic liquid crystal and photo-cured resin material described above were mixed together with a weight ratio of 85:15. It was then sandwiched between two glass substrates that had transparent conductive films on their surfaces, such that the transparent conductive films would be inside, together with 10 $\mu$m spacers. A 15 mW/cm$^2$ ultraviolet light was then projected onto the mixture for three minutes at room temperature so that the resin would harden and the resin and the liquid crystal would separate. Further, a field of view regulating film (Lumisty Z-3030 from Sumitomo Chemical Co., Ltd.) was placed on the observation surface as an anisotropic light scattering layer and a black light absorbing member was placed on the back. A liquid crystal display unit having the construction shown in FIG. 1 was thus obtained. The anisotropic light scattering layer has a characteristic by which it scatters incident light that enters it within the range of 30 to 60 degrees relative to its normal line (that is, incident angle within 30 to 60 degrees), becoming nontransparent, and lets incident light outside said range pass through, becoming transparent.

The selective reflection wavelength of the liquid crystal-polymer composite layer was set to be 100 nm. Therefore, the composite layer reflects light in the infrared range and becomes transparent when the liquid crystal molecules are put in a planar alignment by means of the application of high voltage pulses, while the level of scattering increases and the composite layer becomes white when the liquid crystal molecules are put into a focal conic alignment by means of the application of low voltage pulses. In other words, the liquid crystal display unit becomes a black and white display unit.

Figure 5:
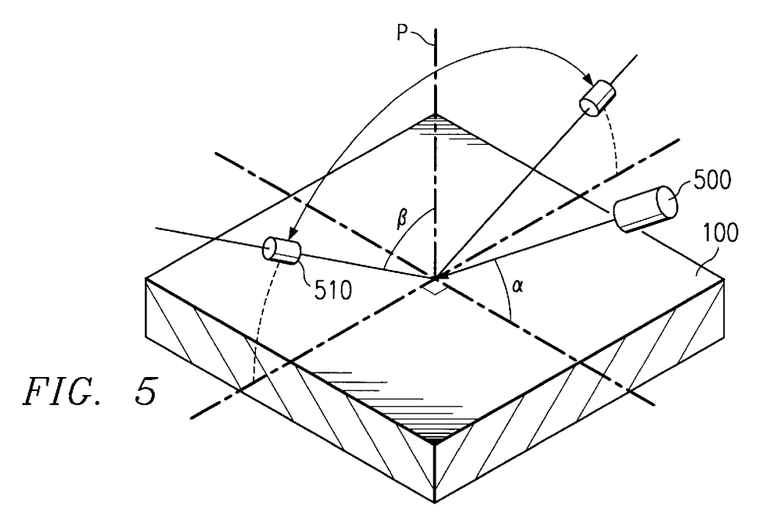
FIG. 5 shows the principle of measurement of the light reflection performed by a liquid crystal display unit.

The luminance of the liquid crystal display unit thus prepared, relative to the viewing angle, was then investigated. FIG. 5 shows the principle of the measurement method regarding the luminance. As shown in FIG. 5, the luminance of the liquid crystal display unit relative to the viewing angle ($\beta$ in FIG. 5) was measured by placing light source 500 at a 45 degree angle ($\alpha$ in FIG. 5) relative to normal line P of the liquid crystal display unit to project light and measuring the luminance while changing the position of luminance meter 510 as if drawing an arc in a plane perpendicular to the plane including normal line P and the direction of projection of light source 500, with the point at which the light enters the display unit as the center of said arc. A fluorescent light was used for the light source and an LS100 (from Minolta) was used for the luminance meter. In addition, the spectral reflectance of each display unit explained below was also measured in the same manner.

Figure 6:
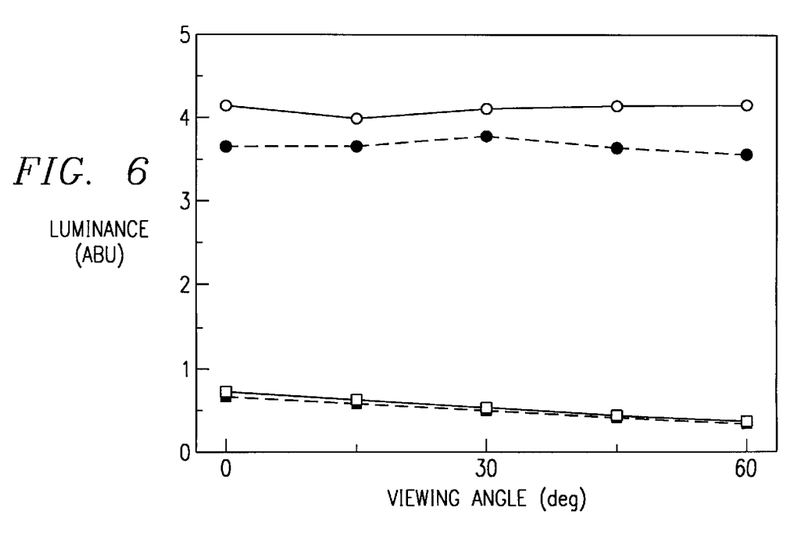
FIG. 6 shows the degree to which the luminance of a white and black display unit depends on the viewing angle.

FIG. 6 shows the results of the measurement. The upper solid line in FIG. 6 indicates the luminance when the liquid crystal was in the scattering state, that is, the focal conic state. The lower solid line in FIG. 6 indicates the luminance when the liquid crystal was in the transparent state, that is, the planar state. For comparison purposes, FIG. 6 also shows, using dotted lines, the results for the liquid crystal display unit of comparison example 1, which was the display unit of experimental example 1 from which the anisotropic light scattering layer was omitted. As shown in FIG. 6, while the luminance of the liquid crystal display unit was essentially the same as that of comparison example 1 when in the transparent state, the luminance increased by around 20% relative to comparison example 1 in which the liquid crystal display unit was in the scattering state.

4. EXPERIMENTAL EXAMPLE 2

Chiral ingredients S811 (from Merck) and CN (from Merck) were added in 9 wt % and 18 wt %, respectively, to nematic liquid crystal MN 1000XX (from Chisso Corp.) to prepare a chiral nematic liquid crystal having a selective reflection wavelength of 630 nm. Here, MN1000XX is a liquid crystal having a tolane compound as its main component and having the physical properties shown below.

$\Delta n=0.219$ ($\lambda$=589 nm, 25° C.)

$T_{N-I}=69.9°$ C.

$V_{90}=2.29V,$ $\eta_{20}=30.6$ cps

A photo-cured resin material was then prepared by adding photopolymerization starting agent DAROCURE 1173 (Ciba Geigy) in 3 wt % to monofunctional monomer MPL-212 (from Nippon Kayaku) to which bifunctional monomer BF530 was added in 20 wt %.

The chiral nematic liquid crystal and the photo-cured resin material described above were mixed in a weight ratio of 85:15. Said mixture was then sandwiched between two glass substrates having transparent conductive films on the surfaces such that the transparent conductive films would be inside, together with 10 $\mu$m spacers. A 15 mW/cm$^2$ ultraviolet light was then projected onto the mixture for three minutes at room temperature so that the resin would harden and the liquid crystal and the resin material would separate. Further, a field of view regulating film (Lumisty Z-3030 from Sumitomo Chemical Co., Ltd.) was placed on the observation surface as an anisotropic light scattering layer, while a black light-absorbing member was placed on the back, and a liquid crystal display unit was thus obtained.

The composite layer of the liquid crystal display unit prepared in this way reflects red light and appears red when the liquid crystal molecules are put in a planar alignment by means of the application of high voltage pulses, and when the molecules are put into the focal conic alignment by means of the application of low voltage pulses, the composite layer becomes transparent. In other words, the liquid crystal display unit becomes a red and black display unit.

Figure 7:
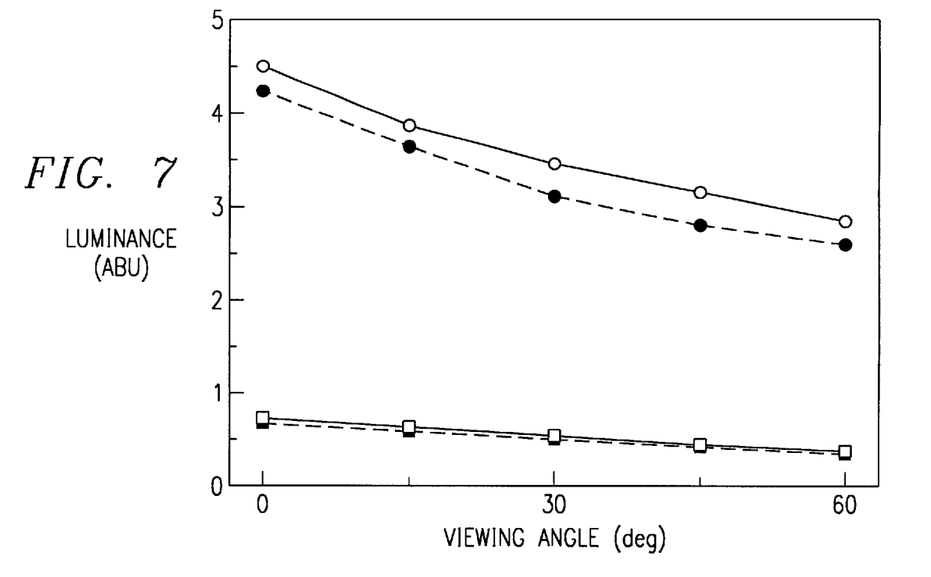
FIG. 7 shows the degree to which the luminance of a red and black display unit depends on the viewing angle.

The luminance of the liquid crystal display unit prepared in this way with reference to the viewing angle was investigated using the same method that was used for experimental example 1. FIG. 7 shows the results of the measurement. The upper solid line in FIG. 7 shows the luminance when the liquid crystal was in the selective reflection state, that is, the planar state. The lower solid line in FIG. 7 shows the luminance when the liquid crystal was in the transparent state, that is, the focal conic state. FIG. 7 also shows, using dotted lines, the results for the liquid crystal display unit of comparison example 2, which was the display unit of experimental example 2 from which the anisotropic light scattering layer was omitted. As shown in FIG. 7, while the luminance of the liquid crystal display unit was essentially the same as that of comparison example 2 when in the transparent state, it increased by approximately 20% relative to comparison example 2 when in the selective reflection state.

In the case of this example, because the selective reflection wavelength is set to the visible light range, it is not preferred in practical use if the selective reflection wavelength varies depending on the viewing angle. Therefore, in this experimental example, the dependence of the selective reflection wavelength (light dispersion spectrum peak wavelength) on the viewing angle was measured.

For the measurement, a tungsten lamp was used for the light source. The measurement was performed in the same manner as the measurement of luminance using a spectro multi channel photo detector (MCPD-2000 from Otsuka Electronics).

Figure 8:
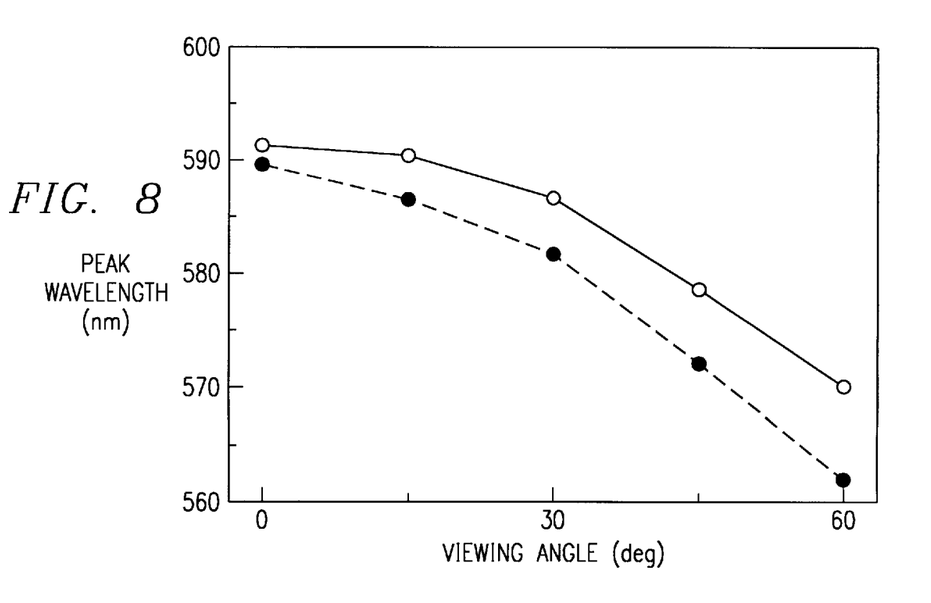
FIG. 8 shows the degree to which the peak wavelength of reflected light in a red and black display unit depends on the viewing angle.

The results are shown in FIG. 8 using a solid line. FIG. 8 also shows for comparison purposes, using a dotted line, the results for the display unit of comparison example 2. As is clear from FIG. 8, the differences between viewing angles in terms of the peak selective reflection wavelength are smaller than for the display unit of comparison example 2.

5. EXPERIMENTAL EXAMPLE 3

A liquid crystal display unit was prepared using the same procedure used for experimental example 2 except that the amounts of chiral doping agents S811 (from Merck) and CN (from Merck) added to the nematic liquid crystal were 10 wt % and 20 wt %, respectively, so that a chiral nematic liquid crystal having a selective reflection wavelength of 550 nm would be obtained.

The composite layer of the liquid crystal display unit prepared in this way reflects green light and appears green when the liquid crystal molecules are put into a planar alignment by means of the application of high voltage pulses, while the composite layer becomes transparent when the liquid crystal molecules are put into a focal conic alignment by means of the application of low voltage pulses. In other words, the liquid crystal display unit becomes a green and black display unit.

Figure 9:
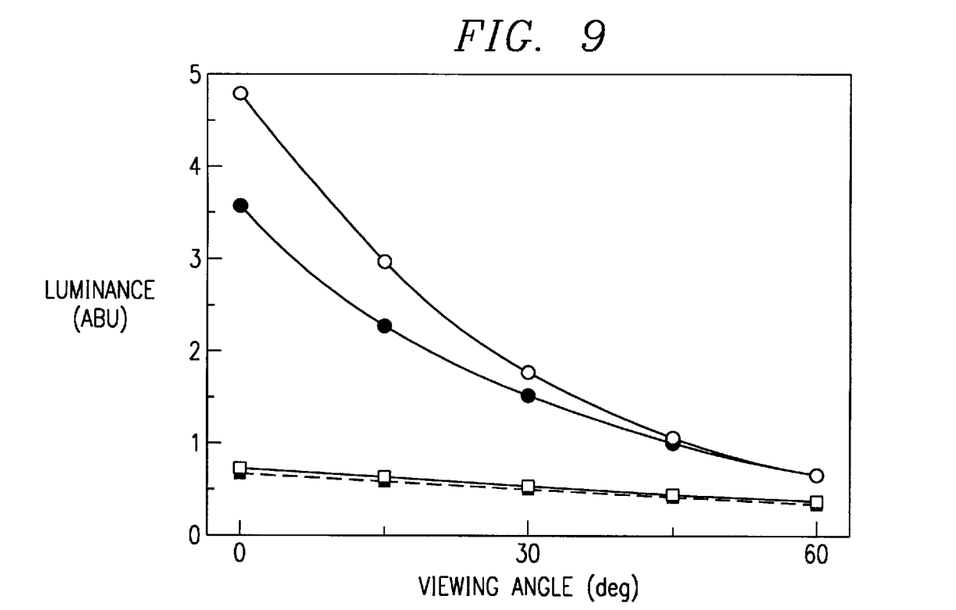
FIG. 9 shows the degree to which the luminance of a green and black display unit depends on the viewing angle.

The luminance of the liquid crystal display unit prepared in this way with reference to the viewing angle was investigated using the same method that was used for experimental example 1. FIG. 9 shows the results of the measurement. The upper solid line in FIG. 9 indicates the luminance when the liquid crystal was in the selective reflection state, that is, the planar state. The lower solid line in FIG. 9 indicates the luminance when the liquid crystal was in the transparent state, that is, the focal conic state. FIG. 9 also shows for comparison purposes, the results for the liquid crystal display unit of comparison example 3, which was the display unit of experimental example 3 from which the anisotropic light scattering layer was omitted. As shown in FIG. 9, the luminance of the liquid crystal display unit of experimental example 3 was essentially the same as that of comparison example 3 when in the transparent state, while it increased by about 20% relative to comparison example 3 when in the selective reflection state.

Figure 10:
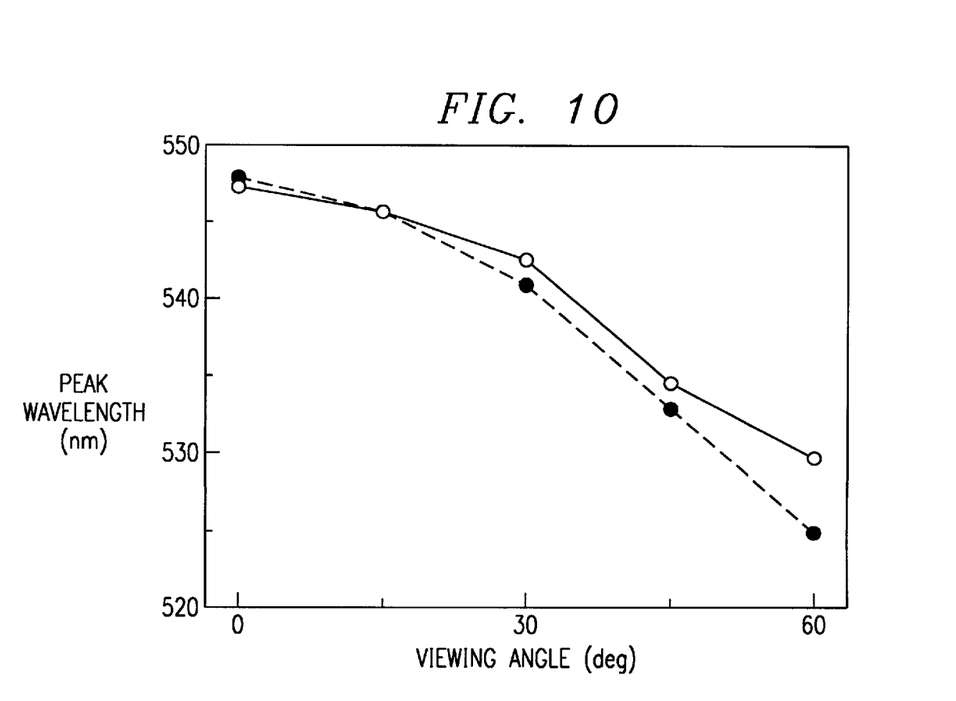
FIG. 10 shows the degree to which the peak wavelength of reflected light in a green and black display unit depends on the viewing angle.

The dependence of the reflection wavelength spectrum of this liquid crystal display unit on the viewing angle was measured using the same procedure that was used for experimental example 2. FIG. 10 shows the results using a solid line. FIG. 10 also shows for comparison purposes, using a dotted line, the results for the display unit of comparison example 3. As is clear from FIG. 10, the differences between viewing angles in terms of the peak selective reflection wavelength are smaller in comparison with the construction of comparison example 3.

In the embodiments explained above, a construction in which the anisotropic light scattering layer is placed on the outermost surface that faces the observer was explained, but the present invention is not limited to this. It is acceptable as long as the anisotropic light scattering layer is located closer to the observer than the liquid crystal layer.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A reflecting liquid crystal display unit formed of a plurality of layers, wherein, arranged from an observer side of said display unit, said display unit comprises:

a first layer that (i) passes light that is incident on an observer side surface of said first layer and within an angular range with respect to a direction normal to the observer side surface of said first layer and (ii) scatters light outside said angular range; and a second layer which includes liquid crystal material and reflects light received through said first layer to display an image, said second layer having a selective reflection wavelength which varies with viewing angle;

wherein said first layer is adapted to reduce a level of color discrepancy of said liquid crystal display unit across a predetermined range of viewing angles.

2. A reflecting liquid crystal display unit in accordance with claim 1, wherein said liquid crystal material of said second layer exhibits cholesteric characteristic.

3. A reflecting liquid crystal display unit in accordance with claim 2, wherein said liquid crystal material is a mixture of nematic liquid crystal material and chiral ingredient.

4. A reflecting liquid crystal display unit in accordance with claim 2, wherein said liquid crystal material reflects light of a specific wavelength when said liquid crystal material is in a planar state.

5. A reflecting liquid crystals display unit in accordance with claim 4, wherein said specific wavelength is in a visible light spectrum.

6. A reflecting liquid crystal display unit in accordance with claim 5, wherein said liquid crystal material lets pass visible light when said liquid crystal material is in a focal conic state.

7. A reflecting liquid crystal display unit in accordance with claim 4, wherein said specific wavelength is in an infrared light spectrum.

8. A reflecting liquid crystal display unit in accordance with claim 7, wherein said liquid crystal material scatters visible light in a case where said liquid crystal material is in a focal conic state.

9. A reflecting liquid crystal display unit in accordance with claim 1, wherein said second layer is a composite of said liquid crystal material and a resin.

10. A reflecting liquid crystal display unit in accordance with claim 9, wherein said resin has a three-dimensional mesh structure, and said liquid crystal material fills gaps formed by said resin.

11. A reflecting liquid crystal display unit in accordance with claim 9, wherein said resin is a photo-curing resin.

12. A reflecting liquid crystal display unit in accordance with claim 1, further comprising a third layer to absorb light passed through said second layer.

13. A reflecting liquid crystal display unit in accordance with claim 1, wherein said first layer scatters light entering said first layer within a range of 30 to 60 degrees with respect to said direction normal to the surface of said first layer.

14. A reflective cholesteric liquid crystal display unit which is capable of color display comprising, in order from an observer side:

an anisotropic light scattering layer, said anisotropic light scattering layer having a scattering characteristic such that light incident thereon for a first range of incident angles, relative to a normal thereto, is substantially scattered and light incident thereon for a second range of incident angles, relative to a normal thereto, is substantially transmitted;

a second layer, which is arranged contiguous with said anisotropic light scattering layer, either directly or through another layer, and which includes a mixture of a liquid crystal material and a chiral ingredient, said second layer having a selective reflection wavelength when liquid crystal molecules therein are arranged in a planar alignment, said selective reflection wavelength varying with viewing angle;

a light absorbing layer, which is arranged contiguous with said second layer, either directly or through another layer;

wherein said anisotropic light scattering layer is adapted to reduce a color discrepancy of said liquid crystal display unit across a predetermined range of viewing angles to a level which is less than a level of color discrepancy which would be achieved with said liquid crystal display unit without said anisotropic light scattering layer.

15. A reflective cholesteric liquid crystal display unit in accordance with claim 14, wherein a quantity of chiral ingredient is such that a selective reflection wavelength of said liquid crystal display is set to a wavelength in a visible light spectrum.

16. A reflective cholesteric liquid crystal display unit in accordance with claim 14, wherein said second range of incident angles, relative to a normal to said anisotropic light scattering layer, is not greater than approximately +30 degrees and not greater than approximately −30 degrees.

17. A reflective cholesteric liquid crystal display unit in accordance with claim 14, further comprising:

a third layer, disposed between said second layer and said light absorbing layer, said third layer including a mixture of a liquid crystal material and a chiral ingredient, said third layer having a selective reflection wavelength when liquid crystal molecules therein are arranged in a planar alignment which varies with viewing angle, said selective reflection wavelength of said third layer being different than said selective reflection wavelength of said second layer.

18. A reflective cholesteric liquid crystal display unit in accordance with claim 17, further comprising:

a fourth layer, disposed between said third layer and said light absorbing layer, said fourth layer including a mixture of a liquid crystal material and a chiral ingredient, said fourth layer having a selective reflection wavelength when liquid crystal molecules therein are arranged in a planar alignment which varies with viewing angle, said selective reflection wavelength of said fourth layer being different than either of said selective reflection wavelength of said second layer or said selective reflection wavelength of said third layer.

* * * * *